United States Patent [19]

Robichaux

[11] Patent Number: 5,435,396
[45] Date of Patent: Jul. 25, 1995

[54] HAND TILLER SOIL CULTIVATION SYSTEM

[76] Inventor: Reginald R. Robichaux, 2315 Kansas Ave., Kenner, La. 70062

[21] Appl. No.: 106,357

[22] Filed: Aug. 13, 1993

[51] Int. Cl.$^6$ .................... A01B 1/18; B25G 3/26
[52] U.S. Cl. .................... 172/378; 172/372; 403/108; 294/58
[58] Field of Search .................... 294/50.6, 57, 58, 59; 172/25, 378, 372, 371; 56/400.21, 400.04; 403/108, 109

[56] References Cited

U.S. PATENT DOCUMENTS

| | | | |
|---|---|---|---|
| 256,039 | 4/1882 | Peters | 175/320 |
| 274,108 | 3/1883 | Connor | 172/25 |
| 425,150 | 4/1890 | Stanley | 172/25 |
| 547,679 | 10/1895 | Read | 294/50.6 |
| 614,512 | 11/1898 | Spitzenberg | 172/133 |
| 685,022 | 10/1901 | Williams | 172/378 X |
| 725,768 | 4/1903 | Prevost | 172/373 |
| 799,359 | 9/1905 | Shaffer | 172/25 |
| 817,083 | 4/1906 | Moeller | 403/108 |
| 864,329 | 8/1907 | North | 403/109 X |
| 1,079,114 | 11/1913 | Davison | 56/400.21 X |
| 1,167,491 | 10/1916 | Gilson | 172/374 |
| 1,232,539 | 7/1917 | Harrison | 56/400.11 |
| 1,293,824 | 2/1919 | Ludwig | 172/378 X |
| 1,600,858 | 9/1926 | Wright | 172/378 |
| 1,776,187 | 9/1930 | Krise | 56/400.21 X |
| 2,047,485 | 7/1936 | McBrady | 403/108 X |
| 2,082,476 | 6/1937 | Allen | 172/25 |
| 2,662,420 | 12/1953 | French et al. | 403/108 X |
| 2,680,643 | 6/1954 | Cravotta | 172/378 X |
| 3,061,270 | 10/1962 | Lowe | 172/378 X |
| 3,129,771 | 4/1964 | Listone | 172/25 |
| 3,335,735 | 8/1967 | Colegrove et al. | 403/108 X |
| 3,847,227 | 11/1974 | Myers | 172/378 |
| 3,947,140 | 3/1976 | Thomas | 403/108 |
| 4,456,075 | 6/1984 | Hostetler | 172/25 |
| 4,476,939 | 10/1984 | Wallace | 56/400.04 X |
| 4,565,398 | 1/1986 | Poulin | 294/52 |
| 4,641,712 | 2/1987 | Cravotta | 172/378 X |
| 4,905,768 | 3/1990 | Lorenz | 172/25 |
| 5,109,930 | 5/1992 | Napier | 172/371 X |
| 5,139,040 | 8/1992 | Kelly | 403/108 X |
| 5,188,340 | 2/1993 | Green | 172/378 X |
| 5,230,385 | 7/1993 | Dinatale | 172/378 |

FOREIGN PATENT DOCUMENTS

| | | | |
|---|---|---|---|
| 31217 | 1/1923 | Denmark | 172/378 |
| 41428 | 1/1930 | Denmark | 172/372 |
| 318929 | 10/1902 | France | 172/378 |
| 508915 | 10/1920 | France | 172/378 |
| 1378114 | 10/1964 | France | 172/378 |
| 302007 | 10/1932 | Italy | 172/378 |
| 56921 | 6/1924 | Sweden | 172/25 |
| 80776 | 9/1919 | Switzerland | 172/25 |
| 160978 | 6/1933 | Switzerland | 172/25 |
| 373589 | 1/1964 | Switzerland | 172/378 |
| 413055 | 7/1934 | United Kingdom | 172/378 |
| 2106761 | 4/1983 | United Kingdom | 172/378 |

*Primary Examiner*—Randolph A. Reese
*Assistant Examiner*—Christopher J. Novosad
*Attorney, Agent, or Firm*—Joseph T. Regard

[57] ABSTRACT

A hand cultivating system for loosening or tilling select portions of the soil in a garden or plot. The preferred embodiment of the present invention contemplates a hand cultivating implement wherein there is provided a longitudinal handle member having first and second ends, the first end having affixed thereto a tined cultivator member including a plurality of tines in general longitudinal alignment with the handle member. Also affixed to the handle member, connected to the handle member in a position in the medial or upper medial area of the handle, disposed generally toward the second end of the handle, is a laterally emanating torque handle, configured to allow the user to partially rotate the handle and tined cultivator member about their longitudinal axis. The present invention as configured is particularly suitable for use in conjunction with gardens and landscape plots, for loosening or turning the soil and removing weeds, while leaving ground cover, such as bark, peat moss, or mulch, relatively intact. An alternative embodiment of the present invention contemplates alternative, interchangeable cultivator members suitable for a variety of tasks, while the preferred embodiment contemplates a single, multi-purpose cultivator member.

1 Claim, 1 Drawing Sheet

HAND TILLER SOIL CULTIVATION SYSTEM

BACKGROUND OF THE INVENTION

1. Invention Field

The present invention relates to gardening implements, and particularly to a hand cultivating system for loosening or tilling select portions of the soil in a garden or plot.

The preferred embodiment of the present invention contemplates a hand cultivating implement wherein there is provided a longitudinal handle member having first and second ends, the first end having affixed thereto a tined cultivator member including a plurality of tines in general longitudinal alignment with the handle member.

Also affixed to the handle member, connected to the handle member in a position in the medial or upper medial area of the handle, disposed generally toward the second end of the handle, is a laterally emanating torque handle, configured to allow the user to partially rotate the handle and tined cultivator member about their longitudinal axis.

The present invention as configured is particularly suitable for use in conjunction with gardens and landscape plots, for loosening or turning the soil and removing weeds, while leaving ground cover, such as bark, peat moss, or mulch, relatively intact.

An alternative embodiment of the present invention contemplates alternative, interchangeable cultivator members suitable for a variety of tasks, while the preferred embodiment contemplates a single, multi-purpose cultivator member.

2. General Background Discussion

While gardening has been a popular hobby for hundreds of years, the present inventor is unaware of any agricultural or gardening implements which provides an easily Implemented, effective, and inexpensive system for loosening soil in a limited area from a standing position. As will be discerned from a review of the below cited patents, the known prior art has provided a number of implements for weeding and spot cultivation, but most of these have been either impractical and inefficient to operate, or overly expensive and not worthy the trouble.

A listing of patents teaching at least known, generally pertinent patents relative the present invention follows:

| Pat. No.  | Inventor(s) | Date of Issue |
|-----------|-------------|---------------|
| 256,039   | Peters      | 04/04/1882    |
| 274,108   | Connor      | 03/20/1883    |
| 425,150   | Stanley     | 04/08/1890    |
| 547,679   | Read        | 10/08/1895    |
| 614,512   | Spitzenberg | 11/22/1898    |
| 725,768   | Prevost     | 04/21/1903    |
| 1,167,491 | Gilson      | 10/11/1916    |
| 1,232,539 | Harrison    | 07/10/1917    |
| 2,082,476 | Allen       | 06/01/1937    |
| 3,129,771 | Listone     | 04/21/1964    |
| 3,847,227 | Myers       | 11/12/1974    |
| 4,456,075 | Hostetter   | 06/26/1984    |
| 4,565,398 | Poulin      | 01/21/1986    |
| 4,905,768 | Lorenz      | 03/06/1990    |

For example, U.S. Pat. No. 274,108 issued 1883 teaches a "Corn Hoe" teaching the a rotating cultivator, wherein there is provided a lateral handle (A') provided on both sides of the handle piece (A), which utilization apparently contemplates a manual twisting motion by the user completely distinguishable from the present invention, and which may in fact be detrimental to the back of the user. Further, '108 also teaches an anchor (D) provided for holding the tines (B, B') in place while they are rotated. In addition, the tine configuration is different, as are the attachments (FIG. 2).

U.S. Pat. No. 614,512 to Spizenberg is distinguishable in operation from the present invention, as the user apparently operates it in a "to and fro", pivotal fashion, as opposed to the longitudinal rotation of your device.

U.S. Pat. No. 425,150 teaches a hand cultivator wherein the tines (G, G') are rotated about a frame (B).

U.S. Pat. No. 2,082,476 teaches a garden tool wherein a set of tines is manually rotated about a longitudinal axis via torque handle 18 on handle piece 16.

U.S. Pat. No. 725,768 teaches a "shuffle hoe" having multiple, interchangeable tine heads.

U.S. Pat. No. 4,565,398 teaches a "Multi-Purpose Compound Hand Tool" having multiple tine and spade heads.

Thus, while the known patents cited above do share some characteristics of the present invention, none teach or contemplate the lightweight yet effective and easily implemented system of the present invention. The '108 patent, although having some similar characteristics when compared to the present invention, is nonetheless in configuration and operation.

Summary Discussion of the Invention

Unlike the prior patents discussed above, the present invention provides an inexpensive, cost effective and durable system for limited cultivation or soil loosening of gardens, landscape plots, or the like.

The preferred embodiment of the present invention contemplates a gardening implement wherein there is provided a longitudinal handle member having first and second ends, the first end having affixed thereto a tined cultivator member including a plurality of tines in general longitudinal alignment with the handle member.

Also affixed to the handle member, connected to the handle member in a position in the medial or upper medial area of the handle, disposed generally toward the second end of the handle, is a laterally emanating torque handle, configured to allow the user to partially rotate the handle and tined cultivator member about their longitudinal axis. This means of operating the present invention allows the user to operate the system without the necessity of bending over or twisting the waist and back area, unlike the prior art, specifically the '108 reference discussed spra.

The present invention is utilized by pressing or plunging the tines of the cultivator member into the soil in a generally lateral manner, and displacing, turning, or loosening the soil by supporting the longitudinal handle member with one hand, and partially rotating said handle member, thereby rotating said cultivator member, by applying back-and-forth pressure to said torque handle with the other hand.

As indicated above, an alternative embodiment of the present invention can include an interchangeable selection of cultivator members, each of which may be specifically designed for a particular operation such as soil turning, weeding, and the like.

It is therefore an object of the present invention to provide a system for turning a limited area of soil by an upright user with i limited amount of effort.

It is another object of the present invention to provide a system for loosening soil in gardens, landscape plots or the like which is operable in a standing position, thereby avoiding back injury or the like.

It is still another object of the present invention to provide a system for loosening soil which may also be utilized for weeding and the like.

Lastly, it is still another object of the present invention to provide a system for loosening soil which is accomplished utilizing an implement which includes a main, longitudinal handle having a first end having attached thereto a cultivator member, a second end wherein there is provided a grasping area, and a medial to upper medial area wherein there is provided a lateral torque handle member affixed thereto.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE INVENTION

Figure 1:
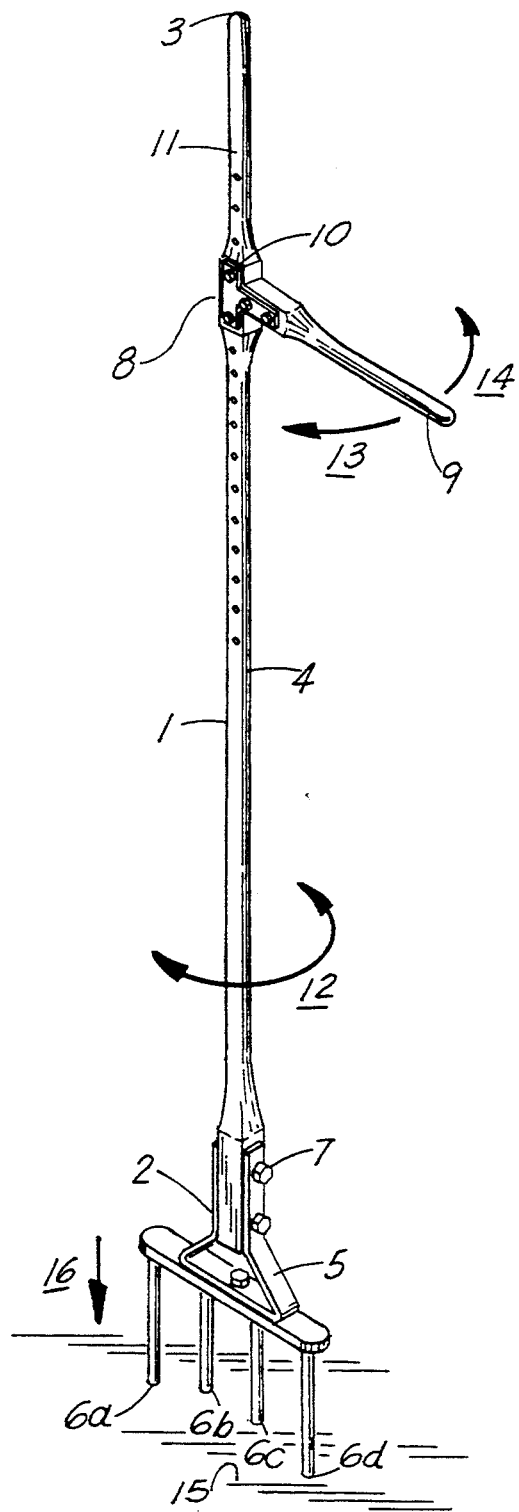
FIG. 1 is an isometric view of the hand cultivating implement of the present invention, illustrating the various components of the present invention, and the operational characteristics thereof.

As can be seen in FIG. 1 of the drawings, the hand cultivator garden implement G of the present invention includes a main handle member 1 of wood or the like having a lower, first end 2, and an upper, second end 3, as well as a medial area 4 therebetween.

Affixed to the first end 2 of the handle member 1 is a cultivator member 5 affixed to the handle via screw 7, bolt or the like. Laterally disposed relative the first end 2 of the handle is the cultivator base 17, having emanating therefrom in longitudinal alignment with the handle member 1 is a plurality of evenly spaced, generally cylindrically configured tines 6a-d. While the base 17 is shown as being threadingly connected to a mounting bracket, which is in turn affixed to the handle member 1, said base 17 may be welded or otherwise a single piece with the mounting bracket, as desired. However, the separate base and bracket arrangement as shown allows for the use of interchangeable cultivator members, such as the alternative design exemplified in FIG. 2.

Returning to FIG. 1, the upper area of the handle member 1, adjacent to the second end 3, is the grasping handle 11, having a generally cylindrical configuration in the preferred embodiment for allowing grasping by the user, and supporting of the handle, during use.

Laterally positioned and affixed to the upper medial area 8 of handle member 1 is lateral torque handle 9. The torque handle 9 emanates in lateral fashion from the handle member 1 a sufficient length to allow the user to grasp the torque handle 9 in operation in order to rotate the handle member 1 about its longitudinal axis. The torque handle 9 is affixed to the handle member 1 via, for example, threaded nut and bolt arrangement 10, screws, or the like interfacing with a mounting bracket. The torque handle 9 may be selectively adjustable in a variety of positions along the handle member, from the medial area of the handle to the grasping handle 11, via spaced mounting apertures or the like. This would allow for the optimal placement of the lateral torque handle relative the height and build of the user.

In implementing the present invention, the user grasps the handle member 1 and/or the torque handle 9, and applies downward pressure 16 such that the tines 6a-d are directed into the ground 15 or area to be loosened, cultivated, or displaced. The user may further place his/her foot upon the base 17 of the cultivator member in utilizing his/her weight for further directing the tines 6a-d into the ground as desired.

Next, allowing the tines to remain at least partially directed into the ground, the user places one hand about the grasping handle 11, and the other about the lateral torque handle 9.

The user then, supporting the handle member 1 in the desired position via the hold upon the grasping handle 11, directs the lateral torque handle 9 towards 14 and away from 13 him or her, applying forward and reverse force, partially rotating 12 the handle member 1 and longitudinally aligned tines 6a-d about the longitudinal axis of said handle member 1, and displacing the ground 15 contacting the tines 6a-d.

As the present system only displaces that soil within the immediate vicinity of the tines, the present tool is especially useful where only limited cultivation or loosening of the soil is desired, such as next to or between plants in a garden or landscape plot, or in uprooting the odd weed which has sprung up in a garden. Also, the present invention as implemented can displace the soil without unduly disturbing ground cover such as bark, sphagnum or peat moss or the like.

Figure 2:
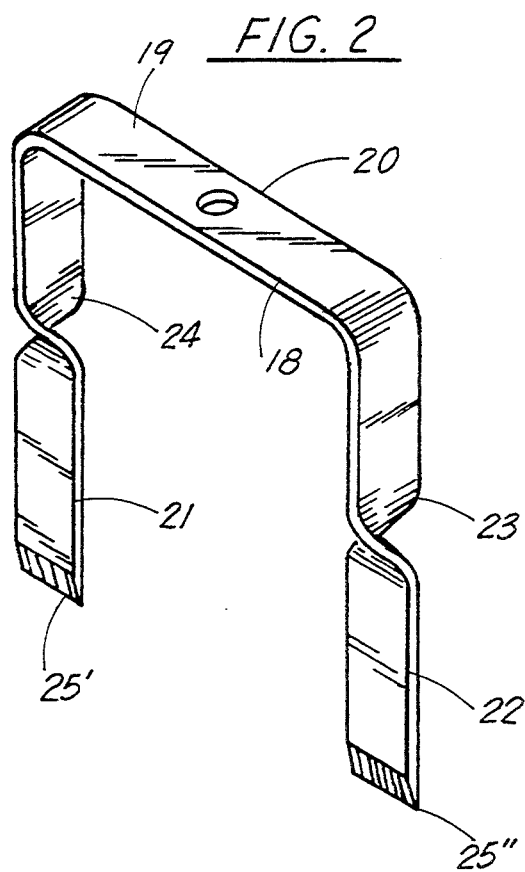
FIG. 2 is a view of an alternative cultivation member of the invention of FIG. 1, which may be interchangeable with the implement of the present invention, as desired for performing a variety of tasks.

FIG. 2 illustrates an alternative cultivation member 18 design of the present invention, wherein the base 19 has emanating therefrom in similar matter to that contemplated in the preferred embodiment an alterative tine design, wherein the tines 21, 22 emanate in lateral fashion from opposing ends of the base 19. The tines 21, 22 are formed from a somewhat flat, rectangularly configured piece, each tine having a ninety degree curve or twist 24, 23, respectively, and pointed ends 25', 25''. This alternative design is implemented in the same manner as that illustrated and taught in the preferred embodiment of the present invention supra, and is particularly suitable for upending weeds or the like, exposing their roots.

As shown, the present invention provides a system for selectively loosening the ground in association with a garden or landscape plot, allowing the user to do so with very little effort, and in a fully standing position, without twisting of the back and the risks of back injury and discomfort associated therewith.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. The method of loosening a plot of ground by a user, comprising the steps of:
   a. providing a hand cultivating implement, comprising:

a main handle member having a lower, first end, an upper, second end, and a medial area therebetween;

a cultivator member affixed to the first end of said main handle member, said cultivator member including a base situated in lateral juxtaposition relative to said main handle member, said base having emanating therefrom in general longitudinal alignment with said main handle member a plurality of generally evenly spaced tines of generally equal length, said tines situated along a common plane;

a grasping handle formed about said main handle member, said grasping handle in longitudinal alignment with said main handle member, said grasping handle adjacent to the second end of said main handle member;

a torque handle affixed to and emanating laterally from said main handle member, said torque handle situated below said grasping handle; and torque handle adjustment means for allowing said torque handle to be affixed to said main handle member in a selectively adjustable fashion, from the medial area of said main handle member, to just below the grasping handle;

b. adjusting said torque handle utilizing said torque handle adjustment means, in such a manner as to allow the user to manipulate said torque handle in a standing position;

c. piercing the plot of ground to be cultivated with said tines of said cultivator member, such that said tines are at least partially placed into the plot of ground;

d. grasping said grasping handle with one hand, supporting said main handle member;

e. grasping said torque handle with the other hand;

f. pushing said torque handle away from the user, partially rotating said main handle member in a first rotational direction about said main handle member's longitudinal axis;

g. pulling said torque handle toward said user, partially rotating said main handle member in an second rotational direction about said main handle member's longitudinal axis;

h. thereby partially rotating said tines of said cultivator member, loosening the soil;

i. lifting said main handle member, removing the tines from the soil;

j. repeating steps b–i.

* * * * *